United States Patent [19]

Tagashira

[11] Patent Number: 5,277,237
[45] Date of Patent: Jan. 11, 1994

[54] TUBELESS RADIAL TIRE FOR HEAVY DUTY USE

[75] Inventor: Kenji Tagashira, Kobe, Japan

[73] Assignee: Sumitomo Rubber Industries Limited, Kobe, Japan

[21] Appl. No.: 774,815

[22] Filed: Oct. 11, 1991

[30] Foreign Application Priority Data

Nov. 7, 1990 [JP] Japan .................................. 2-303380

[51] Int. Cl.$^5$ ............................................. B60C 3/00
[52] U.S. Cl. ..................................... 152/454; 152/539; 152/552
[58] Field of Search .................... 152/454, 539, 552

[56] References Cited

U.S. PATENT DOCUMENTS

| | | | |
|---|---|---|---|
| 4,077,455 | 3/1978 | Curtiss, Jr. et al. | 152/454 |
| 4,258,773 | 3/1981 | de Saint-Michel | 152/454 |
| 4,387,758 | 6/1983 | Matsuda et al. | 152/539 |
| 5,025,844 | 6/1991 | Ueda et al. | 152/552 |

FOREIGN PATENT DOCUMENTS 0364710  4/1990  European Pat. Off. ............ 152/539

Primary Examiner—Michael W. Ball
Assistant Examiner—Nancy T. Krawczyk

[57] ABSTRACT

A tubeless radial tire for heavy duty use which comprises a pair of symmetrically shaped bead cores disposed one in each of the bead portions, a radial carcass having cords extending between the bead portions and turned up around the bead cores, and a belt layer disposed radially outside the carcass and inside a tread, wherein in each bead portion, the carcass is provided with a profile such that the inclination thereof at a point (P) located at the same axial position as the geometric center of the bead core is 45 to 53 degrees with respect to the axial direction of the tire when the tire is mounted on a regular rim and inflated to a pressure of 0.5 kgf/sq.cm.

2 Claims, 6 Drawing Sheets

TUBELESS RADIAL TIRE FOR HEAVY DUTY USE

BACKGROUND OF THE INVENTION

The present invention relates to a tubeless radial tire for heavy duty use, and more particularly to an improvement in the profile of a carcass in bead regions which is capable of preventing bead toes from being lifted from the bead seat of its rim while the tire is mounted thereon.

Recently, tubeless radial tires have been widely used for heavy duty use, e.g. truck and bus use.

As the tire pressure and tire load of such a tubeless tire is fairly large in comparison with those in passenger car tires, the engaging force and air-seal between the tire bead portions and the rim bead seats must be higher. However, when such a heavy duty tire is reused by retreading, the bead toe (a) is, as shown in FIG. 8, often lifted from the bead seat (b) of the rim (j) to form a gap (f). The gap (f) leaks the air during initial inflation, which makes it difficult to inflate the retreaded tire. Further, the gap decreases the engaging force between the tire bead portions and the rim bead seats in the inflated state of the retreaded tire.

An examination about the toe lift was made using Computer Tomography, and it was found that:

1) such a toe lift existed before the worn tire is retread, and this toe lift remains after the tire has been retreaded, and
2) even in a new tire which is mounted on its regular rim and inflated to a high inner pressure, a toe lift occurred, and the amount thereof is almost the same value as that in the worn tire state;
3) the amount of bead toe lift (F) in a worn tire state or the amount of bead toe lift in a new tire state is in direct proportion to the amount of bead toe lift (f) in a retreaded tire state, as shown in FIG. 6, and
4) the durability of bead portions of a retreaded tire is in inverse proportion to the amount of bead toe lift (f), as shown in FIG. 7.

The main cause for a toe lift is a radially outward displacement of the carcass cords (c) caused by inflation to a high inner pressure, which displacement pulls up the surrounding bead rubber, and the bead toe (a) is lifted.

Further, the bead rubber is subjected to deformation repeatedly during running under heavy loads with generating heat, and such a toe lift turns into a permanent deformation of rubber in the worn tire state.

Further, it was confirmed that the above-mentioned problems in the retreaded tire can be solved by preventing bead toes in a new tire state from being lifted from rim bead seats or preventing the bead rubber from being pulled radially outwardly by the carcass.

SUMMARY OF THE INVENTION

It is therefore, an object of the present invention to provide a tubeless radial tire for heavy duty use, in which the initial inflation of the tire in a retread state becomes easy, and the engagement of the bead portions with the bead seats of its regular rim is increased in both the new and retreaded states of the tire.

According to one aspect of the present invention, a tubeless radial tire for heavy duty use which is mounted on its regular rim with 15 degree taper bead seats and low flanges, comprises a pair of symmetrically shaped bead cores disposed on in each of the bead portions, a radial carcass having cords extending between the bead portions and turned up around the bead cores, and a belt layer disposed radially outside the carcass and inside a tread, in each bead portion, the carcass provided with a profile such that the inclination thereof at a point (P) located at the same axial distance as the geometric center of the bead core from the tire equator is not more than 53 degrees with respect to the axial direction of the tire when the tire is mounted on the regular rim and inflated to a pressure of 0.5 kgf/sq.cm.

BRIEF DESCRIPTION OF THE DRAWINGS

An embodiments of the present invention will now be described in detail in conjunction with the accompanying drawings, in which.

DETAILED DESCRIPTION OF THE INVENTION

Figure 1:
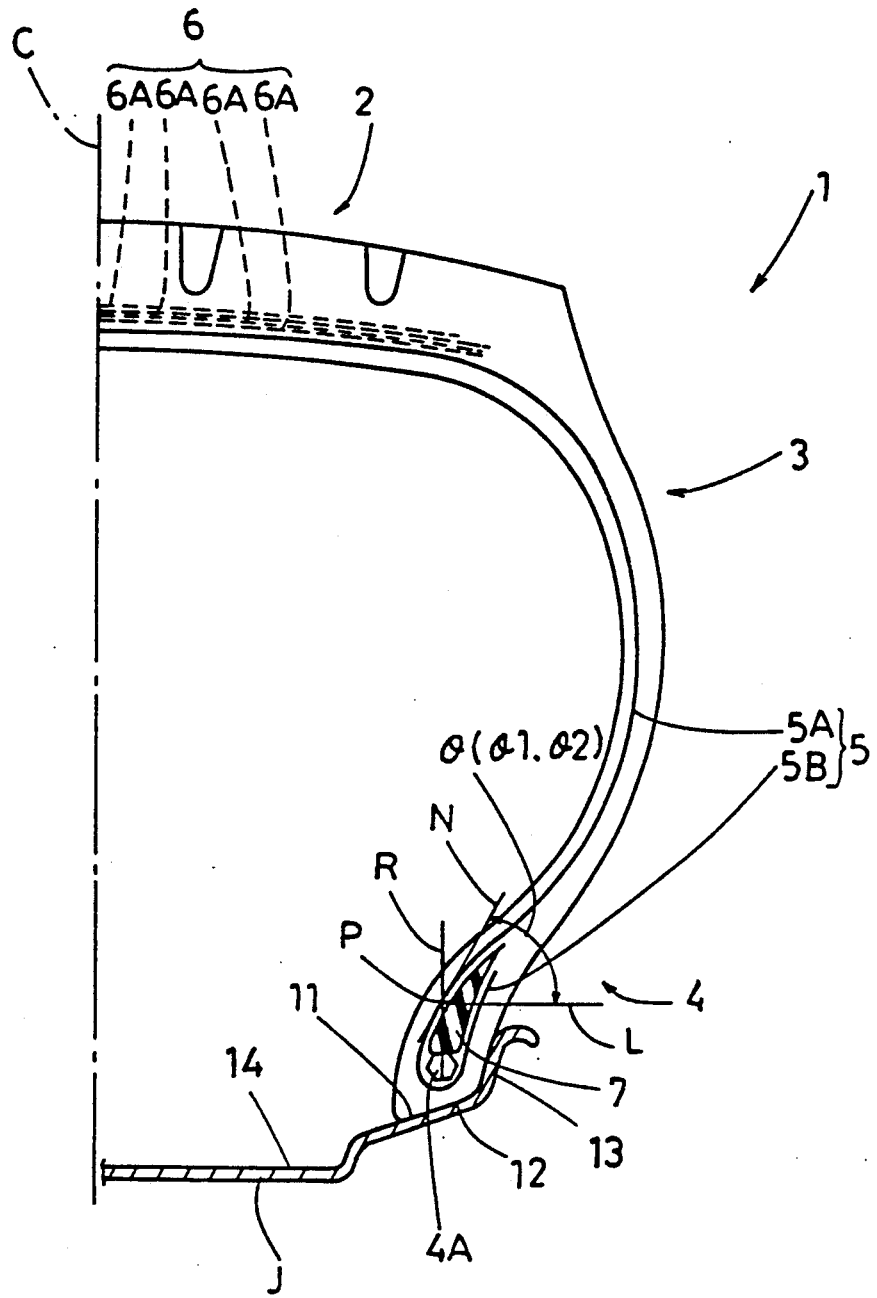
FIG. 1 is a cross sectional view of a right half of a tire according to the present invention.
Figure 2:
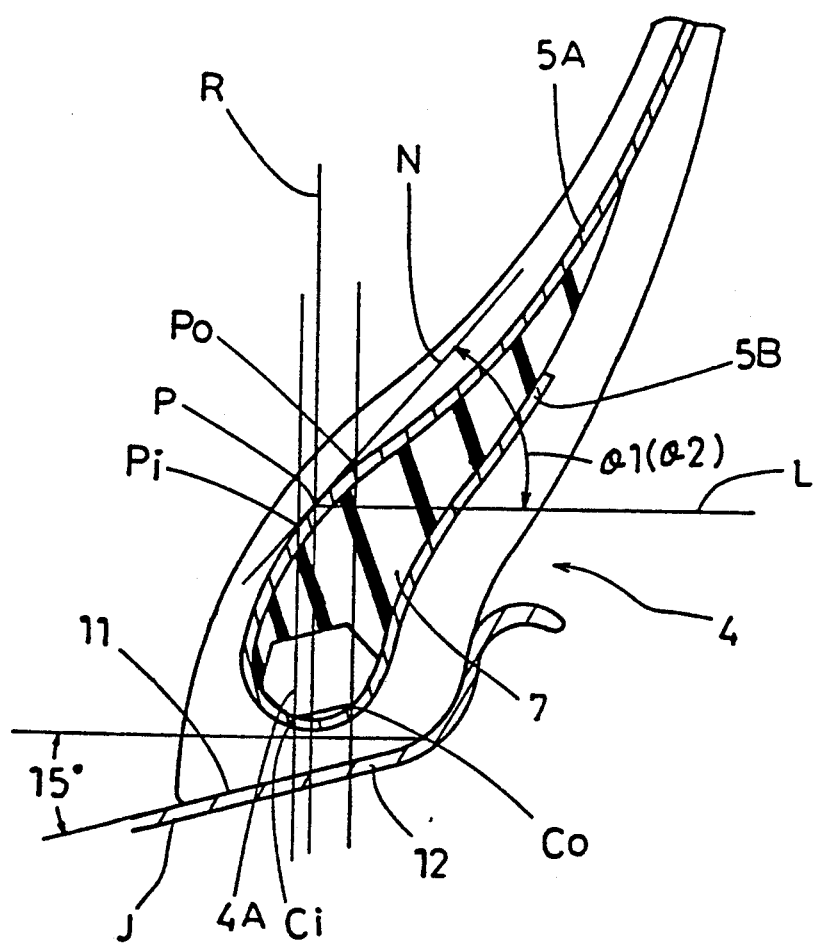
FIG. 2 is an enlarged cross sectional view of the bead portion thereof.
Figure 3:
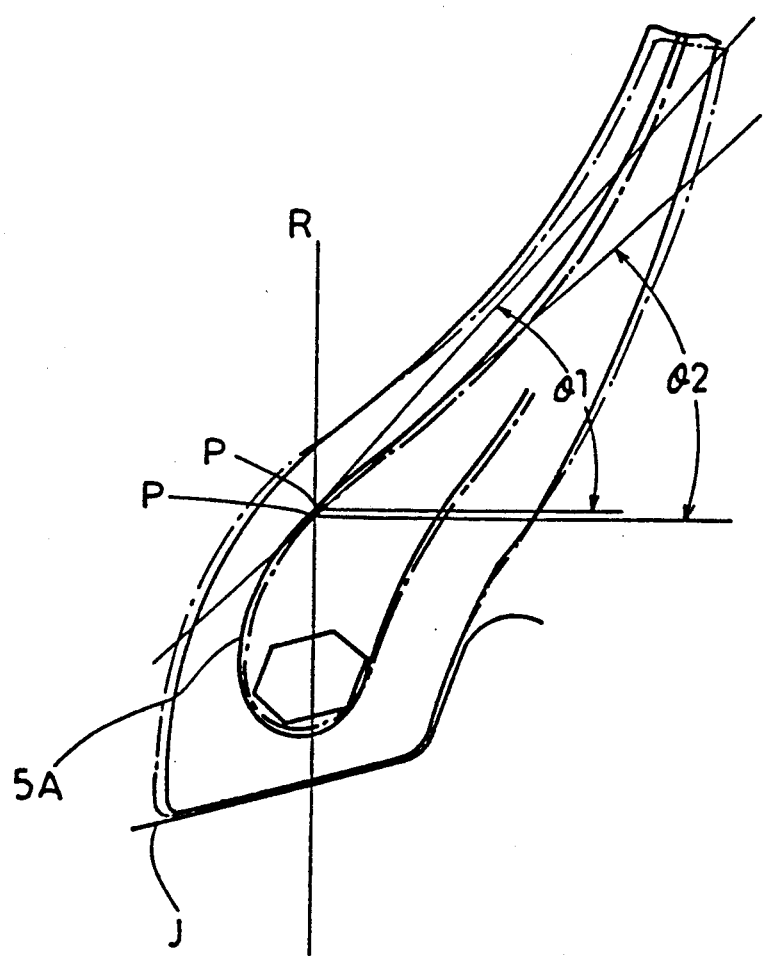
FIG. 3 is a schematic cross sectional view of the bead portion showing its deformation due to tire inflation.

In FIGS. 1-3, tubeless radial tire 1 for heavy duty use has a tread portion 2, a pair of axially spaced bead portions 4, and a pair of sidewall portions 3 extending between the tread edges and the bead portions 4.

The tire 1 comprises a pair of bead cores 4A disposed one in each of the bead portions 4, a carcass 5 having at least one ply of cords arranged radially at 70 to 90 degrees with respect to the tire equator C and extending between the symmetrically shaped bead portions 4 and turned up around the bead cores 4A from the axially inside to the outside thereof to form a pair of turned up portions 5B and a main portion 5A of the carcass, a belt 6 comprising a plurality of plies, in this embodiment four plies 6A, of cords disposed radially outside the carcass 5 and inside the tread 2, and a bead apex 7 made of hard rubber disposed between the carcass main portion 5A and each turned up portion 5B and extending radially outwardly and taperingly from each bead core 4A.

For the carcass cords, organic fiber cords, e.g. nylon, polyester, aromatic polyamide, aromatic polyester, rayon and the like, carbon fiber cords, steel cords and the like can be used.

Each of the belt plies 6A in this embodiment comprises cords laid in parallel with each other and crosswise or parallel to the cords in the next ply and further crosswise to the carcass cords.

For the belt cords, organic fiber cords, e.g. aromatic polyamide, aromatic polyester, nylon, polyester, rayon and the like, steel cords and the like can be used.

Each of the bead portions 4 is provided with a bead base 11 inclined at about 15 degrees with respect to the tire axis, since the tire 1 is to be mounted on its regular rim, a 15 degree drop center rim J. The rim J comprises a pair of axially spaced bead seats 12 inclined in opposed directions at an angle of 15 degrees on which the tire bead portions 4 are respectively seated, a flange 13 extending radially outwardly from the axially outer edge of each bead seat 12, and a well 14 for tire mounting disposed between the bead seats 12.

In each bead portion 4, the profile of the carcass main portion 5A is defined by using the positions of specific points of the bead core 4A.

In this embodiment, the bead core 4A has a depressed hexagonal cross-sectional shape and is located such that its major axis (if regarded as an oval) and one side between angles Ci and Co located adjacently to the bead base are in parallel with the bead base.

As shown in FIG. 2, the angle $\theta$ formed between straight lines N and L, that is, the inclination of the carcass profile at a point P is specifically limited.

Here, the straight line R is a radial line which is drawn radially outwardly from the geometric center of the bead core 4A. The point P is a point of intersection between the above-mentioned radial line R and the profile of the carcass main portion 5A.

The straight line N is a tangential line drawn tangentially to the carcass main portion 5A at the point of intersection P. The straight line L is an axial line drawn axially outwardly from the point P.

Defining the angle $\theta$ under a condition that the tire is mounted on the rim J and inflated to 0.5 kgf/sq.cm. as angle $\theta_1$, and that under a condition that the tire is mounted on the rim J and inflated to its regular inner pressure as angle $\theta_2$, the angle $\theta_1$ is set to be not more than 53 degrees.

Further, the angle $\theta_1$ is preferably set to be not less than 45 degrees, and the difference ($\theta_1 - \theta_2$) of the angle $\theta_1$ from the angle $\theta_2$ is not less than zero and not more than 2.5 degrees.

Using the axial position of the geometric center of the bead core, the angle $\theta_1$ of the inclination of the carcass profile is preferably defined in the range of 45 to 53 degrees with respect to the axial direction of the tire.

Further, in the 0.5 kgf/sq.cm. pressure condition, the angle $\theta_1$ is not larger than the angle $\theta_i$ of the inclination at a point Pi corresponding to the axially inner angle Ci of the hexagonal bead core 4A, and the angle $\theta_1$ is not smaller than the angle $\theta_o$ of the inclination at a point Po corresponding to the axially outer angle Co of the hexagonal bead core 4A, and the difference ($\theta_i - \theta_o$) of the angle $\theta_o$ from the angle $\theta_i$ is in the range of 0 to 5 degrees, and the carcass profile between the points Pi and Po (point P is between them) is slightly curved in this embodiment, but it may be straight.

Figure 4:
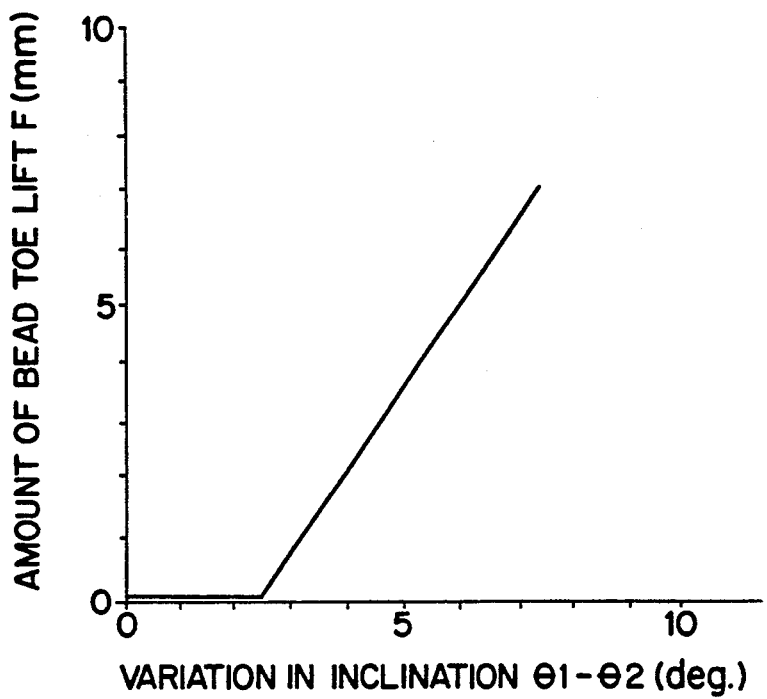
FIG. 4 is a graph showing a relationship between the variation ($\theta_1 - \theta_2$) in the carcass inclination and the amount of toe lift.
Figure 5:
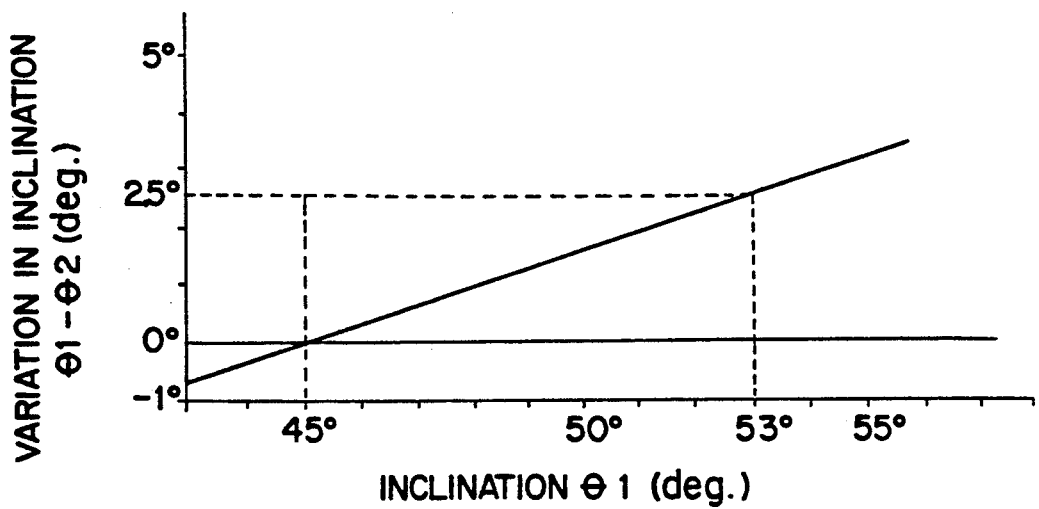
FIG. 5 is graph showing a relationship between the inclination angle ($\theta_1$) at 0.5 KSC and the variation ($\theta_1 - \theta_2$)
Figure 6:
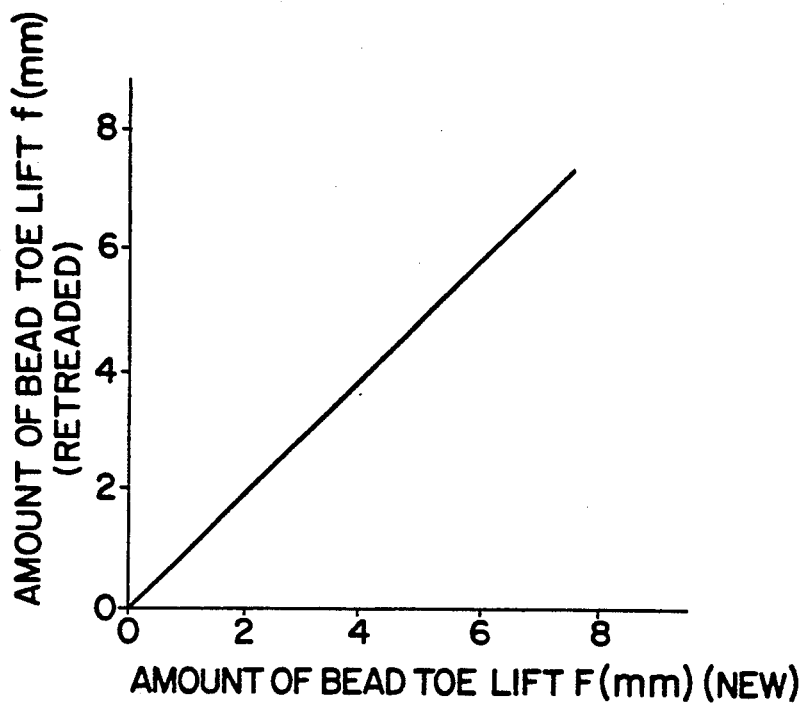
FIG. 6 is graph showing a relationship between the amount of toe lift in a new tire state and that in a retreaded tire state.
Figure 7:
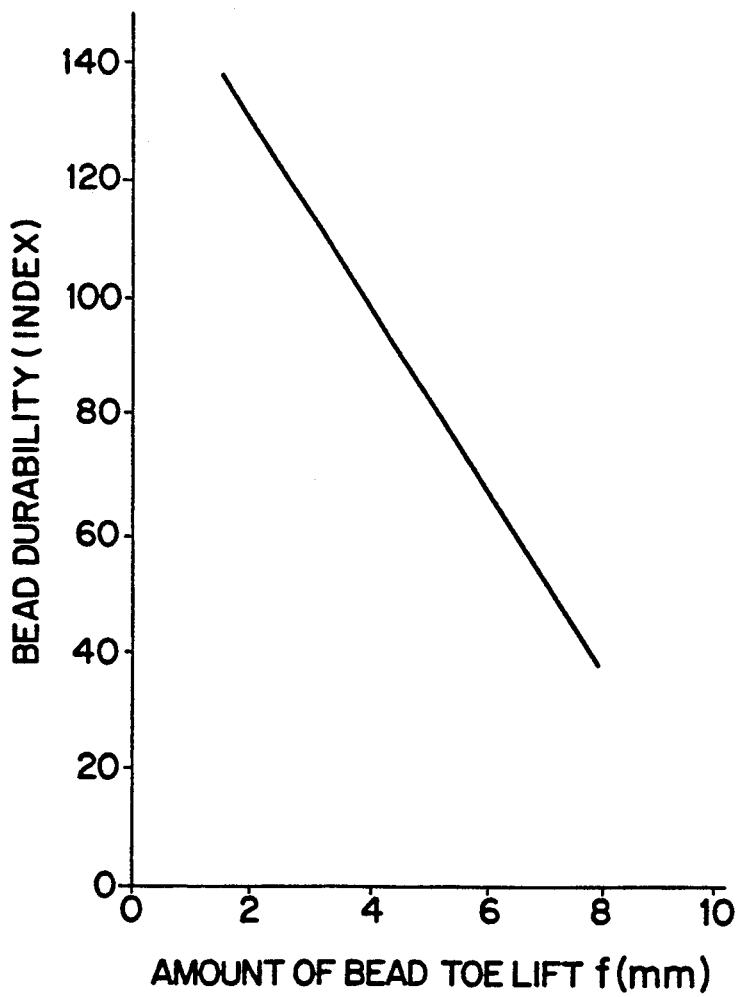
FIG. 7 is a graph showing a relationship between the amount of toe lift in a retreaded tire state and the bead durability of the retreaded tire.
Figure 8:
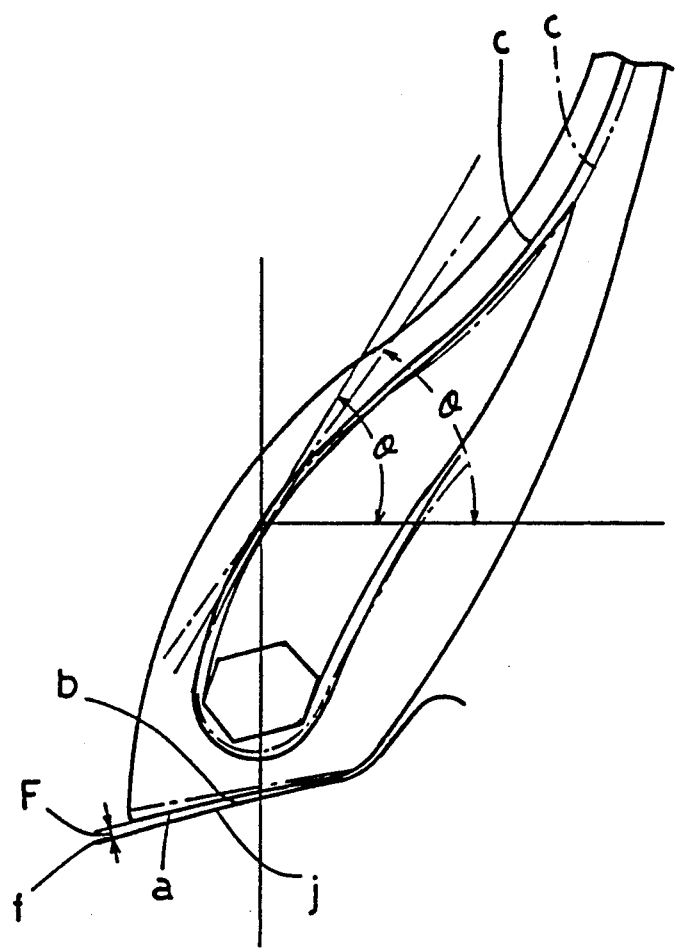
FIG. 8 is a cross sectional view of a tire bead portion according to a prior art.

FIGS. 4 and 5 shows the results obtained by examinations made by the inventor.

FIG. 4 shows a relationship between the angle variation ($\theta_1 - \theta_2$) and the amount (F) of toe lift when inflated to the regular pressure. As apparent therefrom, the amount (F) became zero when the difference ($\theta_1 - \theta_2$) was 0 to 2.5 degrees, and the amount (F) is substantially in direct proportion to the difference when the difference exceeds 2.5 degrees.

FIG. 5 shows a relationship between the angle variation ($\theta_1 - \theta_2$) and the inclination angle ($\theta_1$) at 0.5 kgf/sq.cm. As apparent therefrom, the variation ($\theta_1 - \theta_2$) is in direct porportion to the angle ($\theta_1$), and a variation ($\theta_1 - \theta_2$) of 2.5 degrees which is the higher limit for the zero lift amount corresponds to an angle ($\theta_1$) of 53 degrees.

When the angle ($\theta_1$) is smaller than 45 degrees, the variation ($\theta_1 - \theta_2$) becomes a negative value. That is, as the inner pressure increases from 0.5 kgf/sq.cm. to the regular pressure, the carcass in the bead portion is deformed uprightly. Accordingly, when a tire load is applied, a compressive strain is generated in the bead portions, while the amount of lift is kept at zero. Also the cords therein are subjected to a compressive strain and bending deformation, which results in a deterioration in bead durability.

Tubeless radial tires of size 11R22.5 having the structure shown in FIGS. 1 and 2 and specifications given in Table 1 were prepared. Each test tire was mounted on the regular rim and inflated to the regular inner pressure and tested for bead durability and bead toe lift.

In the bead durability test, the test tire was run at a speed of 20 km/h under a pressure of 8 kgf/sq.cm. and an extraordinary heavy load of 6000 kg, and then the running distance until the bead portion was cracked or the air leak was occurred was measured. The results are indicated in Table 1 by using an index based on the assumption that Reference tire 1 is 100. The larger the index, the better the durability.

The amount of bead lift of each test tire in a new state and that in a retreaded state were measured.

The test results show that
the bead toe of each working example tire was not lifted in both the new state and retreaded state, and
there was no difference in the amount of toe lift between the new state and retread state, and further
the working example tires were superior in bead durability to the reference tires.

As described above, in the tubeless radial tires of the invention, by specifically defining the carcass profile in the bead region, the bead toe in a retread tire state is prevented from being lifted from the bead seat, and thereby the air-tightness between the tire bead base and rim bead seat is improved, and the initial inflation of the tire immediately after the mounting on a rim becomes easy. Further, the bead durability can be improved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

TABLE 1

|  | Ex. 1 | Ex. 2 | Ex. 3 | Ex. 4 | Ref. 1 | Ref. 2 | Ref. 3 |
| --- | --- | --- | --- | --- | --- | --- | --- |
| Carcass (ply) | 1 | 1 | 1 | 1 | 1 | 1 | 1 |
| Cord material | steel | steel | steel | steel | steel | steel | steel |
| Cord angle (deg.) | 90 | 90 | 90 | 90 | 90 | 90 | 90 |
| Belt (ply) | 4 | 4 | 4 | 4 | 4 | 4 | 4 |
| Cord material | steel | steel | steel | steel | steel | steel | steel |
| Angle θ1 (deg.) @ 0.5 KSC | 45 | 49 | 53 | 44 | 54 | 56 | 58 |
| Angle diff. θ1-θ2 (deg.) | 0 | 1.4 | 2.5 | −0.3 | 2.9 | 3.5 | 4.1 |

TABLE 1-continued

|  | Ex. 1 | Ex. 2 | Ex. 3 | Ex. 4 | Ref. 1 | Ref. 2 | Ref. 3 |
|---|---|---|---|---|---|---|---|
| Toe lift | | | | | | | |
| F (new) (mm) | 0 | 0 | 0 | 0 | 0.5 | 1.4 | 2.2 |
| f (retreaded) (mm) | 0 | 0 | 0 | 0 | 0.5 | 1.4 | 2.2 |
| Bead durability (index) (retreaded) | 102 | 105 | 105 | 98 | 100 | 90 | 83 |

I claim:

1. A tubeless radial tire for heavy duty use comprising
a pair of bead portions, each of the bead portions having a symmetrically-shaped bead core disposed therein,
a tread,
a radial carcass having cords extending between the pair of bead portions and turned up around each of the bead cores, and
a belt layer disposed radially outside the carcass and inside the tread, wherein
in each bead portion, the carcass is provided with a profile radially outward from the bead core such that an angle $\theta_1$ of the carcass at a point P located at the same axial position as the geometric center of the bead core is in a range from 45 to 53 degrees with respect to the axial direction of the tire when the tire is mounted on the regular rim and inflated to a pressure of 0.5 kgf/sq.cm,
the variation $\theta_1 - \theta_2$ of the angle $\theta_1$ from the angle $\theta_2$ of the carcass at the point P located at the same axial position as the geometric center of the bead core with respect to the axial direction of the tire when the tire is mounted on the regular rim and inflated to its regular pressure is in a range from 0 to 2.5 degrees,
the bead core has a hexagonal cross-sectional shape and is located such that one side between an axially inner angled point Ci and an axially outer angled point Co located adjacently to the bead base is in parallel with the bead base, and
in the 0.5 kgf/sq.cm. pressure condition,
the angle $\theta_1$ at the point P is not larger than an angle $\theta_i$ of the carcass at a point Pi located at the same axial position as the axially inner angled point Ci with respect to the axial direction of the tire, and the angle $\theta_1$ is not smaller than an angle $\theta_o$ of the carcass at a point Po located at the same axial position as the axially outer angled point Co with respect to the axial direction of the tire, and
the difference $\theta_i - \theta_o$ of the angle $\theta_o$ from the angle $\theta_i$ is in a range of 0 to 5 degrees.

2. The tire according to claim 1, wherein the bead base is inclined at about 15 degrees so as to accommodate to a 15-degree-tapered rim.

* * * * *